March 13, 1962 F. B. HYMEL, JR 3,025,358

AUTOMATIC DIALING SYSTEM

Filed April 8, 1958 2 Sheets-Sheet 1

INVENTOR,
FRANCIS B. HYMEL, JR.

BY Ivan P. Tashof,

ATTORNEY

March 13, 1962 F. B. HYMEL, JR 3,025,358

AUTOMATIC DIALING SYSTEM

Filed April 8, 1958 2 Sheets-Sheet 2

INVENTOR,
FRANCIS B. HYMEL, JR.

BY [signature]

ATTORNEY 3,025,358
AUTOMATIC DIALING SYSTEM

Francis Benedict Hymel, Jr., 2820 General Pershing St., New Orleans, La.

Filed Apr. 8, 1958, Ser. No. 727,131
19 Claims. (Cl. 179—90)

The present invention relates to a pulse producing means and more particularly to an automatic pulse producing means to be used in an automatic telephone dialing system.

Automatic dialing systems have been conceived wherein a series of cards or code means each having thereon a telephone number have been fashioned, the cards or code means being used to actuate a dial to eliminate the necessity for manually dialing each number as in a conventional dial.

However, in the prior art devices, during the use of such a code means, the code means must be continually moved in order to generate the dial pulses. Alternatively, instead of moving the code means, mechanical sensing means move to scan the code on the code means.

By the present invention the need for moving the code means or the sensing means has been eliminated thereby eliminating the wear and tear on the code means and/or the sensing means as well as speeding up the sequence of dialing.

According to the present invention, a plurality of code cards are provided, one for each of the telephone numbers which are frequently dialed. These cards or code means are maintained in a file and to utilize the present system, it is merely necessary to remove the telephone receiver from the hook and depress or otherwise press into active position a selected code means.

As soon as the selected code means is placed in the active position, the pulse producing means of the present invention automatically produces a series of dial pulses corresponding to the telephone number indicated on the code means.

In accordance with one aspect of the present invention, there is provided an electrical circuit and means for producing electrical pulses in said circuit, said means preferably including a plurality of relay means, each relay means triggering the next relay means in succession, the triggering of each relay means causing an electrical pulse in said circuit.

More specifically, there is associated with each relay means a switch means, each of the switch means being connected in series in said circuit with the switch means being normally closed to permit electricity to flow through said circuit, each relay means, as it is triggered momentarily opening its associated switch to cause a pulse in said circuit.

Furthermore, each relay means preferably includes a solenoid, and a capacitor, the activation of the solenoid of one relay means charging the capacitor of the next successive relay means and the inactivation of the solenoid discharging the capacitor through the solenoid of the next successive relay means.

In accordance with another aspect of the present invention there is provided a selector means which includes sensing means for sensing the code on the code means and means responsive to the selector means to prevent one of said relay means and all the relay means subsequent thereto from causing said pulses.

The selector means automatically causes the production of a series of pulses in the pulse producing means, the number of pulses being determined by the code on the code means. As each digit of the telephone number is successively sensed, a series of pulses are produced which correspond to the telephone number to be dialed. After the last number has been sensed, the code means is placed in an inactive position and the entire system is ready to be used with a new code means to dial another number.

According to the present invention, the automatic dialing system described hereinafter may be used as a substitute for the conventional dial or it may be used with a conventional dial. In the latter case, the user has the option of using the automatic system or the conventional manual method of dialing, it being understood of course that both cannot be used simultaneously.

The automatic system of the present invention will now be described in detail with particular reference to the accompanying drawings.

Figure 1:
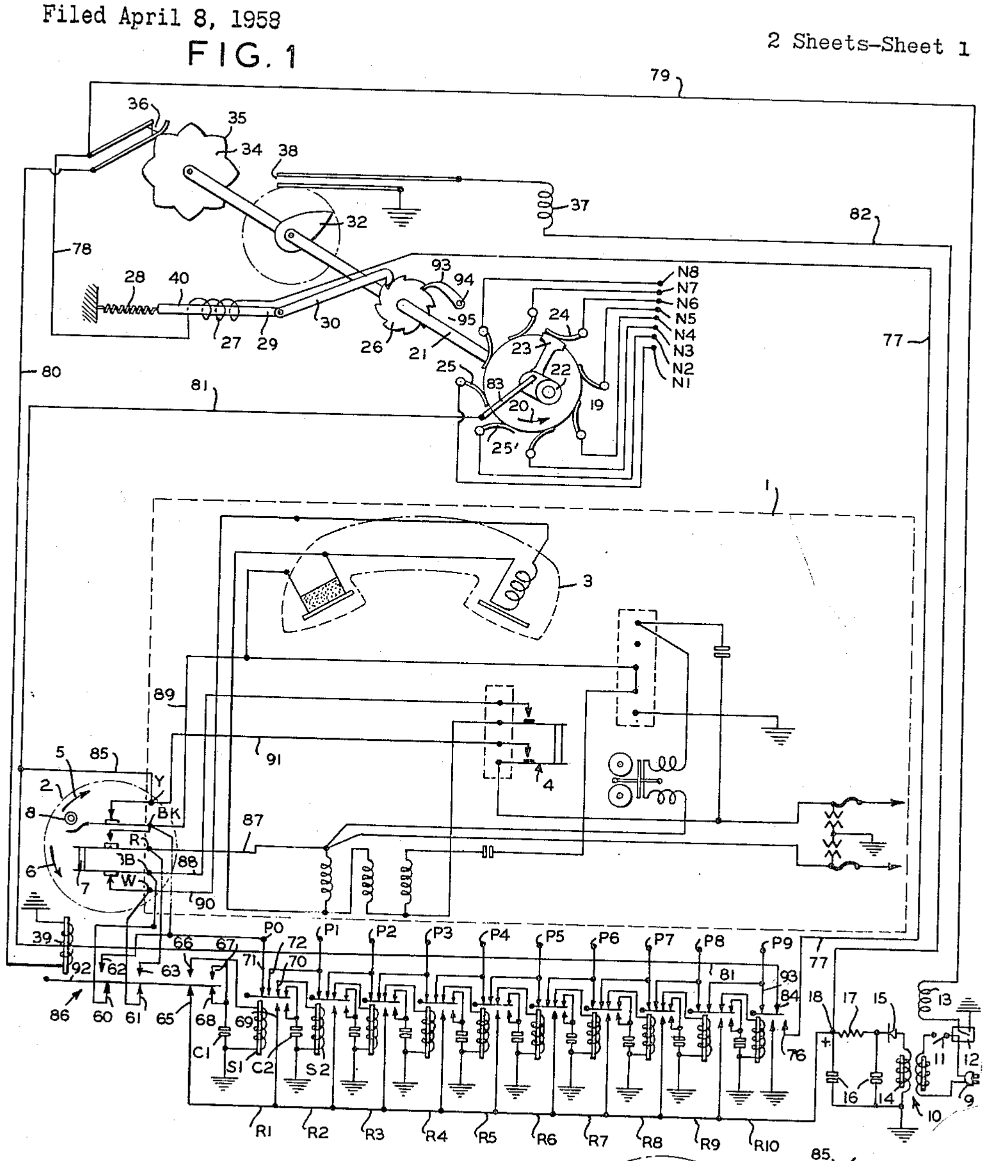
FIG. 1 is a schematic diagram of the automatic dial system of the present invention, showing its relationship to the conventional dial telephone.

Referring particularly to FIG. 1, there is shown bounded by the dotted line 1, a standard telephone circuit. This circuit includes a head set 3 and a switch operated by the receiver hook. This switch 4 as shown in the drawing is in reality a double switch wherein the bottom contact always makes first and breaks last when the telephone receiver is removed or replaced onto the hook. Since this circuit is a standard circuit, no further description thereof is necessary.

Associated with this telephone system is a dial 2, the various elements thereof being shown in lines within the circle 2. This dial has five contacts Y, BK, R, BB, and W. To each of these contacts is normally attached wires 85, 89, 87, 88 and 90 respectively.

When the conventional dial is rotated in the direction shown by arrow 5, that is, clockwise, contact W and BB are broken and R makes contact with BK. When the dial is released, it rotates in the direction of arrow 6, that is, counterclockwise, and during this rotation an insulated hammer 8, driven by a cam, causes the hammer to strike the extended portion of BK a number of times equal to the digits dialed. This action breaks contacts BK from contacting with Y a number of times equal to the digits dialed. After the last strike of the hammer (and the last current interruption caused by BK breaking contact with Y) R breaks contact with BK and BB again makes contact with W. The dial is now ready for normal use for the next digit to be dialed. Then the procedure is repeated for each number to be dialed. When the dial is rotated in the direction indicated by arrow 5, the hammer does not strike BK. Thus, when rotating the dial in a clockwise direction, the first action to take place is contact BB breaking from contact W and R making contact with BK. The last action is contact BB making contact with W and R breaking with BK. In other words, BB stays broken from W and R stays in contact with BK during the entire rotation of the dial clockwise and its counter-clockwise rotation to the normal position.

An insulated strip 7 causes BB and R arms to move simultaneously.

In accordance with one aspect of the present invention, the manual dial, that is the portion within the dotted circle 2, and to the left of contacts Y, BK, R, BB and W, is removed and there is substituted therefor the novel circuit shown in FIG. 1 in the area outside the dotted lines 1.

The automatic dial system of the present invention is powered by a source of current external to that of the telephone. Into this source is plugged plug 9, the source being the conventional household A.C. source of current. The A.C. current from the household source passes through transformer 10. The A.C. voltage from secondary winding 14 is rectified by selenium rectifier 15 to produce a D.C. plus voltage in contact 18. With the secondary coil 14 and the rectifier 15, there is included a conventional capacitor 16 and resistor 17 which complete the rectifying circuit.

There is included in the circuit to the primary of the power transformer 10 a switch 11 whose function will be later described.

Winding 13 of the transformer supplies A.C. voltage to wire 79. In this circuit is thermal delay switch 12 which allows the power supplied to build up complete D.C. voltage before an A.C. voltage is built up in winding 13.

The pulse producing means comprises a master relay 86 and a plurality of relays R1, R2, R3, R4, R5, R6, R7, R8, R9 and R10. Relay arm 92 of master relay 86 is actuated by solenoid 39. In its normal or non-operative position the relay arm 92 closes contact between contacts 60 and 61 which are respectively connected to wires 88 and 90 of the telephone circuit through contacts BB and W respectively.

Upon actuation of the solenoid 39, relay arm 92 breaks contact between contacts 60 and 61 and makes contact between contacts 62 and 63 which are respectively connected to wires 89 and 87 of the telephone circuit through contacts BK and R respectively.

Relay arm 92 in its normal position makes contact between contact 65 (the D.C. plus line) and contact 68 which is connected to capacitor C1. When solenoid 39 is actuated, the connection between contacts 65 and 68 is broken and in turn contact is made between contacts 66 and 67, 67 being connected to contact 68 and 66 being connected to one terminal of the solenoid S1. The other terminal of solenoid S1 is connected to the other plate of capacitor C1. Thus, it is seen that when the relay arm 92 is in the normal position, D.C. current flows through contacts 65 and 68 and charges capacitor C1, and when the solenoid 39 moves relay arm 92, the capacitor C1 discharges through solenoid S1.

Associated with each of relays R1–R9 are switch means including contacts 71 and 72 for relay R1 and similar contacts for each of relays R2–R9. Relay R10 has associated therewith a switch including contacts 93 and 84. These contacts 71, 72, 93 and 84 and the intervening contacts are all connected in series to form a circuit one end of which is connected to wire 81, the other end being connected to contact 62. Thus, it is evident that when the relays R1–R10 are in their normal positions, their respective solenoids have no current flowing through them, and a continuous circuit is provided. Furthermore, when each of the switch elements such as that identified by 71 and 72 are interrupted in succession, a pulse is created in the circuit defined by the switches.

Each of relays R1–R9 are actuated by their respective relay arms and switches similar to that shown by the contacts 65, 66, 67 and 68 of the master relay 86. In other words, contact 69 supplies D.C. voltage to capacitor C2 and contact 70 is connected to one terminal of solenoid S2, the other contacts being connected to one terminal of capacitor C2.

When relay arm of relay R10 is actuated, its lever arm connects contact 76 to ground which permits A.C. voltage to flow through wire 77, through solenoid 27, and then through wires 78 and 79 and A.C. winding 13 of power transformer 10.

Figures 2, 3, 4, 5, 8:
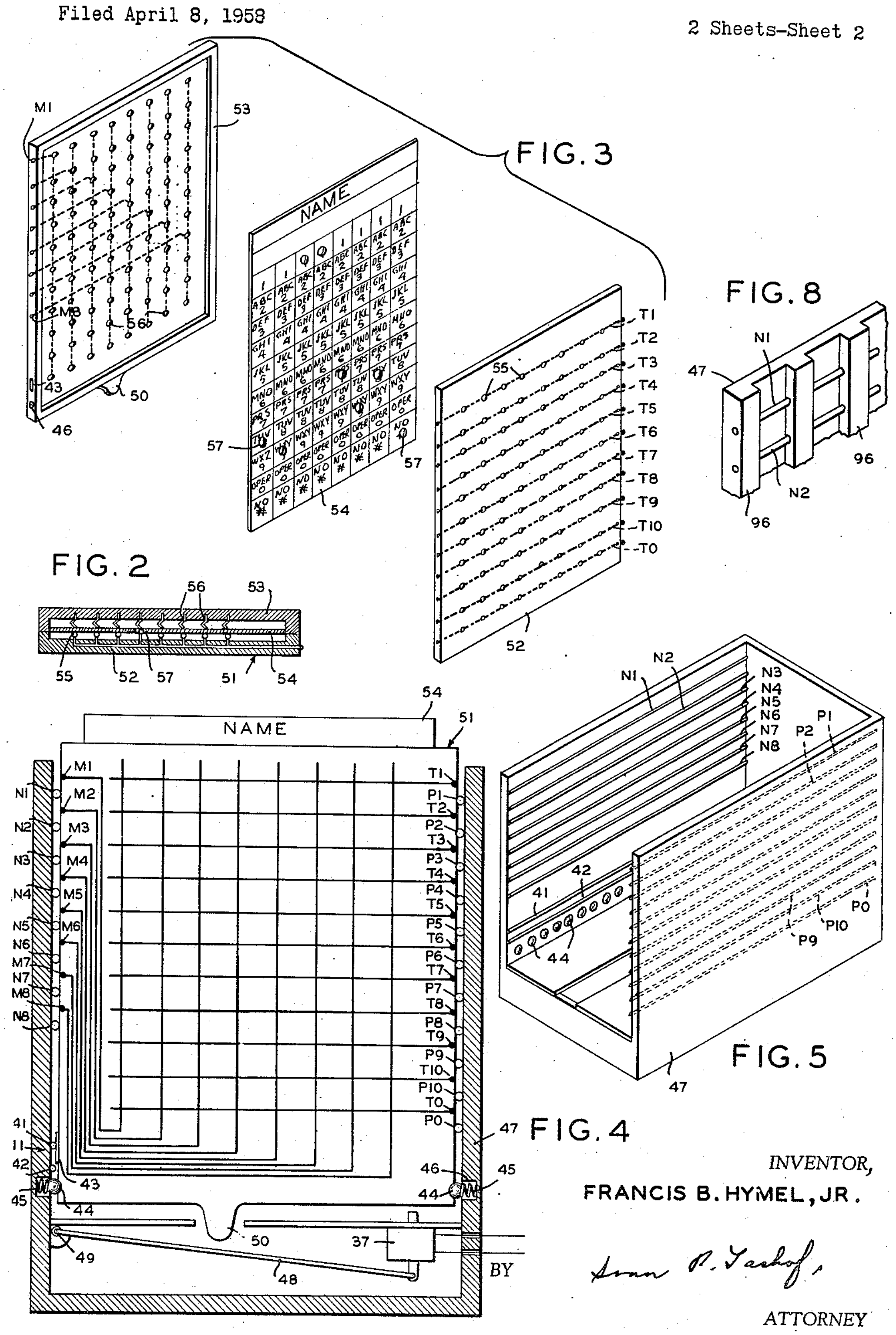
FIG. 2 is a horizontal cross-section of the code card assembly.
FIG. 3 is an exploded view of the code card assembly.
FIG. 4 is a diagrammatic front elevation of a card assembly rack or file showing a single card assembly therein.
FIG. 5 is a perspective view of the code card rack.
FIG. 8 is a fragmentary perspective view of a wall of the code card rack showing a modification wherein spaces are used to maintain the card assemblies in a vertical position.

Connected with contacts 71 and 93 and the intervening corresponding contacts in each of the relays is a contact P0, P1, P2, P3, P4, P5, P6, P7, P8 and P9 which are the contact strips of the code card file as shown in FIGS. 4 and 5.

The coding means of the present invention comprises a card 54 (see FIGS. 2, 3 and 4). One of these cards is provided for each telephone number which it is desired to store in the automatic selector file.

In the form illustrated, the card is provided with a plurality of vertical columns and a plurality of horizontal rows. Although a conventional standard telephone number has seven units, the card of the present invention may have a number of vertical columns equal or exceeding the number of units of a telephone number. In the card of FIG. 3, there are eight vertical columns, the first seven representing units of the telephone number, the eighth one being provided for expansion of the system or for use in areas where there are eight units. Normally, each column represents one unit of the telephone number and each column is divided into eleven horizontal areas which may have printed thereon the same information which appears counter-clockwise around the conventional dial, which information utilizes ten areas. In addition, there is provided at the bottom of each column another area which is marked "NO #" which is used in the event the telephone number comprises less units than there are vertical columns.

The name of the person whose telephone number is indicated on the card may be imprinted on the top of the card. When using such a card, the telephone number is indicated thereon by perforating the card at the appropriate positions. Thus, for example, for a telephone number TW—1—1798 in the first vertical column, the TUV box will be perforated, in the second vertical column, the WXY box will be perforated, and so on until the number is indicated on the card as shown in FIG. 3.

The card assembly 51 includes in addition to the card 54 a front contact plate 52 and a rear contact plate 53. Each front contact plate has a plurality of contacts 55 corresponding in number to the number of indicia areas on card 54.

The rear contact plate has similar contacts 56. These contacts 55 and 56 project inwardly of the rear and front contact plates, as shown in FIG. 2, so that when the card 54 is assembled between the plates, wherever a hole 57 appears in the card, the corresponding contacts 55 and 56 will touch and close a circuit. In order to facilitate the projection of contacts 55 and 56 through the holes 57 to permit them to make contact with each other, the contacts 55 and 56 may be spring contacts or otherwise made of resilient material.

The contacts of each horizontal row of the front contact plate are connected to each other, and to a terminal at the side of the plate such as the terminals T1, T10 and T0. Each of the terminals or contacts 56 of the rear plate, in each vertical row or column are connected to each other and to a terminal as M1–M8. One of the contact plates has projecting therefrom a tongue 50. At the side of one of the plates is a recess 46 and a switch plate 43.

For each number which it is desired to store in the code card file, there is thus provided a "sandwich" such as shown in FIGS. 2 and 3 comprising a code card and a pair of contact plates.

The file, see FIGS. 4 and 5, comprises a frame 47 which vertically supports a plurality of assemblies 51. In the interior of one side of the file there is provided a series of conductor strips N1, N2, etc., to N8. On the interior of the other side of the file, there is a similar series of strips, eleven in number, T1–T10 and T0. When the code card assembly is in the file, as shown in FIG. 4, the contacts T1, etc., are adjacent to but out of contact from the terminals P1, etc and similarly the contacts N1, etc. are out of contact from the terminals M1, M2, etc.

If desired, means such as spacers 96 may be provided on the vertical walls of frame 47 to assist in maintaining the card assemblies in a vertical position in the file, see FIG. 8.

From FIG. 4 it can be seen that the contacts are so aligned that when the card assembly 51 is depressed or lowered into the card file, each of T1, T2, etc. will make contact with P1, P2, etc. and M1, M2, etc. will make contact with N1, N2, etc.

There is also included in the card file a means such as shown by ball 44 and spring 45 for maintaining the code card assemblies in their inoperative positions. Ball 44 normally seats within recess 46 of the rear contact plate 53.

When a number is to be dialed utilizing the automatic system of the present invention, a selected card assembly is depressed and thereby makes contact between contact 41, 42 by means of plate 43, which three elements together comprise switch 11 which is shown in FIG. 1 as part of the power supply from the house lines.

The selector means of the present invention also comprises a shaft 21, see FIG. 1, which is mounted in an annular member 19. Secured to annular member 19 and rotatable therewith is a ring 22 making permanent contact with contact arm 23. Associated with ring 22 is arm 23 which makes contact with ring 22 as the ring 22 rotates.

Figure 6:
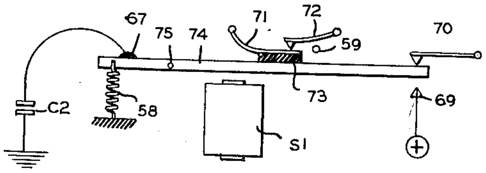
FIG. 6 is an enlarged fragmentary view of one of the relays of the automatic dial system.

Disposed around the periphery of annular member 19 are a plurality of contacts 24, 25, etc. each of which is connected to one of contacts N1, N2, N3, N6, N8, etc. which are the contact strips of the card assembly file shown in FIGS. 5 and 6. The annular member rotates in the direction shown by arrow 20, i.e. counter-clockwise. Thus, it is evident that annular member 19, ring 22, contact arm 23 and spaced contacts 24, 25, etc. together constitute a rotary switch means for successively making contact between a common or central contact 23 with each of the spaced contacts 24, 25, etc. upon relative motion between said contact arm 23 and the spaced contacts.

Secured to shaft 21 is a toothed or ratchet member 26 which receives pawl 30. Pawl 30 is pivotally connected to rod 29 which is an extension of magnetic core 40 of solenoid 27. Rod 29 is non-magnetic. The other end of core 40 is secured to spring 28. Thus, it is seen that when solenoid 27 is activated, it will move arm 40 to the right, as shown in the drawing, and this movement will place pawl 30 in position to engage a tooth of the toothed disk 26. When the solenoid 27 is inactivated, the return spring 28 will withdraw core 40 from the solenoid and retract pawl 30 so that pawl 30 will rotate the disk 26 an angular distance equal to one tooth.

Associated with ratchet member 26 is a lock pawl 93 pivoted at 94 and held in engagement with the ratchet member by means of spring 95. This lock pawl acts to prevent movement in the wrong direction of the ratchet member as a result of the friction occurring when pawl 30 reaches for the next tooth. Any other conventional means may be used to prevent reverse rotation of ratchet member 26.

There is also secured to shaft 21 eccentric cam 32 which closes switch 38 once every revolution of shaft 21. This switch 38, when closed, actuates solenoid 37 (see also FIG. 4) which in turn raises lever 48 which is pivoted at one end at 49. When lever 48 is raised, it presses against tongue 50 of the card assembly and returns it to an inactive position. This occurs when the number indicated by the card has been completely "dialed."

Cam 32 is so mounted on shaft 21 that said cam operates to close switch 38 only momentarily as the contact arm 23 moves between the stationary contact associated with N8 and stationary contact 25 which is connected to N1. In other words, cam 32 does not remain in position to close switch 38 permanently after the last digit of the number has been dialed but cam 32 only closes switch 38 momentarily. Therefore, switch 38 remains open after the last digit has been dialed. If switch 38 were to remain closed after the dialing of the last digit, it would prevent the next card assembly from functioning since as soon as the next card assembly is depressed into the operative position, the current would flow through solenoid 37 and immediately eject the card assembly to the inoperative position. Momentary closing of switch 38 is sufficient to energize solenoid 37 to move lever 48 against tongue 50 to reject the card assembly and complete the dialing procedure.

There is also secured to shaft 21 another toothed disk 34 having teeth 35 equal in number to the teeth on toothed disk 26. The teeth 35 are so arranged that as pawl 30 rotates disk 26, which causes corresponding rotation of disk 34, teeth 35 break and re-make the circuit including switch 36. Whenever switch 36 opens up, it breaks the circuit of solenoid 39 and permits relay arm 92 to drop. When the switch 36 is closed, it again reactivates solenoid 39.

The operation of the automatic dialing system will now be described. A plurality of cards 54 are punched with holes 57 to indicate the telephone number represented by each card. In the card of FIG. 3 the number is TW—1—1798. Each of the cards is assembled between a pair of front and rear contact plates 52 and 53. These card assemblies are placed vertically in the file 47, each of the assemblies being maintained in the inoperative position shown in FIG. 4 by means of the balls 44 seating in the respective notches 46.

The plug 9 is plugged into the house current and it may remain there whether or not a number is being dialed since no current is being drawn when all card assemblies are in the inactive position.

When dialing a number, the receiver 3 is removed from its hook and a card assembly corresponding to the number desired to be called is depressed. When such a card assembly is depressed, switch 11 is closed. The closing of switch 11 causes a D.C. voltage to be created at contacts 18 and 65 thereby charging the capacitor C1 since relay arm 92 is in the position shown in FIG. 1. As soon as thermal delay switch 12 is closed, an A.C. current flows through winding 13 of power transformer 10 which current then flows through wire 79, switch 36 (which is closed) and thence through wire 80 to activate solenoid 39. At this point the shaft 21 would be in the position wherein rotatable contact 23 would be in contact with contact 25.

When solenoid 39 is activated, relay arm 92 is raised thereby breaking the connection between contacts 60 and 61 and establishing connection between contacts 62 and 63. At the same time relay arm 92 breaks the connection between contacts 65 and 68 and establishes connection between contacts 66 and 67 thereby permitting capacitor C1 to discharge through solenoid S1. Solenoid S1 then opens the switch represented by contacts 71 and 72 to create a pulse in the circuit including wire 85 and contact BK. At the same time as a result of the activation of solenoid S1, D.C. current flows through contact 69 to charge capacitor C2.

Since solenoid S1 was activated by the discharge of capacitor C1, it is only momentarily activated and, therefore, as soon as capacitor C2 is charged, solenoid S1 becomes inactivated thereby establishing connection between contacts 71 and 72 and at the same time permitting capacitor C2 to discharge through solenoid S2.

This action continues through all the relays R1 through R10. However, when the solenoid of relay R10 is activated, contact 76 is connected with ground thereby permitting current to flow through wire 77 which activates solenoid 27. Activation of solenoid 27 moves solenoid core 40 against the tension of spring 28 and thereby moves pawl 30 into a position to engage the next tooth of disk 26.

Since the current flowing through contact 76 is of short duration, the solenoid 27 is then inactivated permitting spring 28 to withdraw core 40 and permitting pawl 30 to retract and rotate disk 26 a distance equal to one tooth.

The rotation of disk 26 causes the rotation of shaft 21 which in turn rotates annular member 19 in the direction of arrow 20 to move rotatable contact 23 in contact with the next contact 25'.

However, when the card assembly 51 is placed in the active position in the card file, and when the card in the assembly corresponds to that of FIG. 3, a contact 55 of front contact plate will make contact with a contact 56 of the rear contact plate. Since, in the card shown in FIG. 3 in the first vertical column thereof, hole 57 appears only in the "TUV" position, there is established contact between M1 and T8.

Therefore, there is a connection between contacts P8, T8, M1 and N1. This is the equivalent of connecting N1 to P8 when dialing the first number. Since N1 is connected to contact 25, rotatable contact 23, contact arm 83, and wire 81, the end result is that of shorting out of the pulse circuit, the switch associated with relays R9 and R10 thus producing only eight pulses in the pulsing circuit. These eight pulses are produced by the successive activation of relays R1 through R8. Thus, the first number has been dialed.

It is evident that although the switches associated with the relays are short circuited, the relays still continue to operate resulting in a final pulse through contact 76 which actuates the pawl 30 to rotate disk 26 and the element associated therewith an annular distance equal to one tooth.

During the rotation of shaft 21, disk 34 also rotates a distance equal to one tooth thereby opening and immediately closing switch 36. The opening of switch 36 causes the inactivation of solenoid 39 and thereby returns relay arm 92 to its normal position. As soon as relay arm 92 returns to its normal position, a D.C. voltage is again built up across contacts 65 and 68 to charge capacitor C1. However, the rotation above described of disk 34 immediately closes switch 36 again activating solenoid 39, again commencing a pulsing cycle. This time, because of the hole 57 in the second vertical column of card 54, contact N2 becomes electrically connected with contact P9 thereby causing nine pulses in the pulsing circuit.

This action continues until the last vertical column of card 54 has produced its appropriate pulses. At this time the rotation of disk 26 brings eccentric cam 32 into position to close switch 38 momentarily which causes current to flow through wire 82 and solenoid 37 thereby raising lever 48 which in turn presses against tongue 50 to raise the card assembly 51 to its inactive position where it is retained by balls seating in recess 46.

Figure 7:
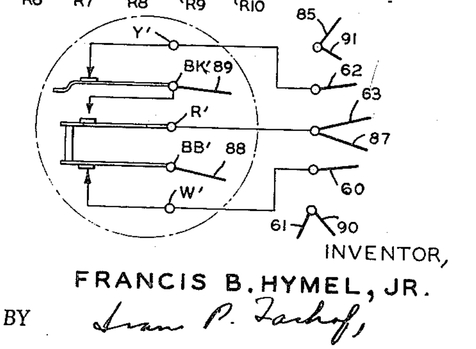
FIG. 7 is a fragmentary schematic diagram of a modification wherein the telephone is equipped both with a mechanical dial and an automatic dial.

In the operation above described, the automatic dialing system of the present invention was substituted for the conventional manual dial. However, if so desired, both the conventional dial and the automatic system may be wired into a conventional telephone circuit in the manner indicated in FIG. 7. In FIG. 7, Y', BK', R', BB', and W' are the contacts equivalent to Y, BK, R, BB and W of the conventional dial.

Wires 88 and 89 of the telephone circuit are connected to contacts BB' and BK' respectively. Contact 61 of the automatic dial system is connected to wire 90 of the telephone system. Wire 85 of the automatic system is connected to wire 91 of the telephone system. Contacts 60 and 62 of the automatic system are connected respectively to contacts W' and Y' of the manual dial. Contact 63 and wire 87 are connected to R' of the dial. When connected in this manner, the user of the telephone may use either the manual dial or the automatic system at will.

The present system has been described with reference to telephone numbers containing seven digits although the card may be used with numbers having eight digits. Therefore, in the last vertical column of the card an opening 57 is punched in the bottom space in the box or area indicated "NO #." The contacts 55 associated with this last row of spaces are indicated as T0 in the front contact plate and this corresponds to P0 in FIG. 1. Thus, when a space marked "NO #" is sensed, all of the switch means associated with relays R1–R10 are shorted out of the circuit and no pulse is produced.

Since in the preferred form of the present invention there are ten relays, when the number 0 is punched in the card, it is not necessary to short out any of the switch means and, therefore, the terminal P10 shown in FIG. 4 does not appear associated with any relay in FIG. 1.

In a preferred form of the invention, each of relays R1–R10 are so designed to insulate all of the switch contacts in the pulse circuit, the wires to the sensing contacts in the file and the wires to the annular member 19 from the remainder of the circuit. This is shown in FIG. 6.

Each relay has a relay arm 74 pivoted at 75, the relay arm being maintained in the inactive position by spring 58. There is provided an insulated plate 73 which maintains contacts 71 and 72 out of contact with the relay arm 74. There is also provided a stop 59 which results in contacts 71 and 72 to be broken momentarily and to be made again before the relay arm makes contact with the next relay solenoid contact 70.

In addition, the electrical system of the power supply and the relays is entirely insulated from the telephone circuit itself to avoid any interaction between the power supply and that of the telephone company power supply.

It is evident that the code means does not have to have a structure precisely that shown in FIG. 3. It may have any particular shape and the indicia may be arranged in any manner thereon. It is not necessary to indicate the code on the card by means of perforations but the code may be indicated on the code means by means of conductive areas or any other means for providing connections between the contacts of the front contact plate and the contacts of the rear contact plate.

Furthermore, the file or magazine 47 does not have to provide space for storing all the card assemblies. If so desired, a card assembly can be taken from another storage rack and placed in the magazine only as it is being used. Obviously, in such a construction the magazine need provide space for only one card assembly.

Although the present system has been described particularly in connection with a telephone dial system, it is evident that the automatic pulse producing means described herein may be used with any device wherein a series of pulses are used.

Therefore, according to the present invention, there has been provided an automatic pulse producing system comprising a pulse means and a selector means. The selector means includes a magazine for receiving a code means which contains a plurality of codes in a predetermined order and the magazine has associated with it, means for sensing the codes on the code means.

There is also provided a rotatable contact having spaced around it a plurality of contacts connected to the sensing means for determining the order of sensing the codes on the code means. There is also provided means for causing the pulse producing means to produce a series of electrical pulses and means responsive to the sensing means to limit the number of pulses to that corresponding to the code sensed by the sensing means on the code means.

After the code has been sensed and the predetermined pulses have been produced, the rotatable contact is rotated to make contact with another of the spaced contacts and also to cause the pulse producing means to produce another series of electrical pulses and thereby repeat the sensing cycle until all the codes on the code means have been sensed.

By way of example, capacitor 16 may be 200 mfd., capacitors C1, C2 etc. may be 20 mfd., and resistor 17 may be 1000 ohms. These values are merely examples which may be used when the automatic dial system is plugged into conventional 115 volt A.C. house current.

I claim:

1. A pulse producing means comprising a plurality of relay means, each relay means triggering the next relay means in succession, each relay means having switch means associated therewith, each of said switch means being connected in series in an electrical circuit, said switch means being normally closed thereby permitting electricity to flow through said circuit, each relay means, as it is triggered, momentarily opening its associated switch means while the remaining switch means remain closed to cause a pulse in said circuit.

2. In combination, a pulse producing means comprising a plurality of relay means, each relay means triggering the next relay means in succession, each relay means having switch means associated therewith, each of said switch means being connected in series in an electrical circuit, said switch means being normally closed thereby permitting electricity to flow through said circuit, each relay means, as it is triggered, momentarily opening its associated switch means while the remaining switches remain closed to cause a pulse in said circuit, selector means, and means responsive to said selector means to prevent one of said relay means and all relay means subsequent thereto from causing said pulses.

3. A combination as recited in claim 2 wherein said last relay means of said succession of relay means re-sets the pulsing cycle beginning with the first relay means.

4. A combination as recited in claim 1 wherein each relay means includes a solenoid and a capacitor, the activation of the solenoid of one relay means charging the capacitor of the next successive relay means, and the inactivation of said solenoid discharging said capacitor through the solenoid of said next successive relay means.

5. A pulse producing means comprising a plurality of relay means, each relay means triggering the next relay means in succession, each relay means, as it is triggered, causing an electrical pulse, each relay means including a solenoid and a capacitor, the activation of the solenoid of one relay means charging the capacitor of the next successive relay means, and the inactivation of said solenoid discharging said capacitor through the solenoid of said next successive relay means.

6. In an automatic pulse producing system, a pulse producing means comprising a plurality of relay means, each relay means triggering the next relay means in succession, each relay means having switch means associated therewith, each of said switch means being connected in series in an electrical circuit, said switch means being normally closed thereby permitting electricity to flow through said circuit, each relay means, as it is triggered, momentarily opening its associated switch while the remaining switches remain closed to cause a pulse in said circuit, selector means, said selector means including code means, sensing means for sensing a code on said code means, and means responsive to said sensing means to prevent, in accordance with a preselected code on said code means, one of said relay means and all relay means subsequent thereto from causing said pulses.

7. An automatic pulse producing system as recited in claim 6 wherein said sensing means prevents said relay means from pulsing by short-circuiting the switch means associated therewith and with the relay means subsequent thereto.

8. An automatic pulse producing system as recited in claim 6 wherein said selector means includes means for successively sensing a plurality of predetermined codes in said code means.

9. An automatic pulse producing system as recited in claim 8 including means for re-setting said pulse producing means after each code in said code means has been sensed.

10. An automatic pulse producing system as recited in claim 9 including means for terminating the operation of said pulse producing means and said selector means after the last code of said code means has been sensed and to prepare the system for again sensing a code means.

11. In a signaling system, a master relay means, a pulse circuit, a pulse producing means for producing pulses in said pulse circuit when said master relay means is activated, said pulse producing means comprising a plurality of relay means, each relay means triggering the next relay means in succession, switch means associated with each of said relay means, each of said switch means being connected in series in said pulse circuit, said switch means being normally closed thereby permitting electricity to flow through said circuit, each relay means, as it is triggered momentarily opening its associated switch while the remaining switches remain closed to cause a pulse in said circuit, selector means, means responsive to said selector means to prevent one of said relay means and all relay means subsequent thereto from causing said pulses in said circuit, said selector means determining the number of pulses, each relay means including a solenoid and a capacitor, the activation of the solenoid of one relay means charging the capacitor of the next successive relay means and the inactivation of said solenoid discharging said capacitor through the solenoid of said next successive relay means.

12. In an automatic dial system for use with a telephone circuit, five dial terminals, a master relay means, the first and second of said terminals being normally connected by said master relay means when inactivated, the third and fourth of said terminals being connected when said master relay means is activated, a pulse circuit connecting said fourth and fifth terminals, a pulse producing means for producing pulses in said pulse circuit when said master relay means is activated, said pulse producing means comprising a plurality of relay means, each relay means triggering the next relay means in succession, switch means associated with each of said relay means, each of said switch means being connected in series in said pulse circuit, said switch means being normally closed thereby permitting electricity to flow through said circuit, each relay means, as it is triggered, momentarily opening its associated switch while the remaining switches remain closed to cause a pulse in said circuit, selector means, means responsive to said selector means to prevent one of said relay means and all relay means subsequent thereto from causing said pulses in said circuit, said selector means determining the number to be dialed, each relay means including a solenoid and a capacitor, the activation of the solenoid of one relay means charging the capacitor of the next successive relay means and the inactivation of the solenoid is charging the capacitor through the solenoid of said next successive relay means, said selector means including means for successively sensing a plurality of codes in said code means, means for resetting said pulse producing means after each code in said code means has been sensed, and means for terminating the operation of said pulse producing means and said selector means after the last code on said code means has been sensed to prepare the system for again sensing a code means.

13. An automatic dial system as recited in claim 12 in combination with a manual dial, means interconnecting said dial and said terminals to selectively permit either automatic or manual dialing.

14. In an automatic dial system for use with a telephone circuit, five dial terminals, a master relay means, the first and second of said terminals being normally connected by said master relay means when inactivated, the third and fourth of said terminals being connected when said master relay means is activated, a pulse producing circuit connecting said fourth and fifth terminals, a pulse producing means for producing a pulse in said pulse circuit when said master relay means is activated, said pulse producing means comprising a plurality of relay means, each relay means triggering the next relay means in succession, each relay means, as it is triggered, causing an electrical pulse in said pulse circuit, selector means including a magazine for receiving a code means containing a plurality of codes in predetermined order, means associated with said magazine for sensing the codes on said code means, a rotatable contact, a plurality of contacts spaced around said rotatable contact, said spaced contacts being connected to said sensing means for determining the order of sensing said codes, means responsive to said sensing means to limit the number of pulses to that corresponding to the code sensed, means for rotating said rotatable contact after a code has been sensed to make contact with another of said spaced contacts and to again activate said master relay to cause the pulse producing means to produce another series of pulses and to repeat the sensing cycle until all the codes on said code means have been sensed.

15. In an automatic pulse producing system, a pulse producing means and a selector means, said selector means including a magazine for receiving a code means containing a plurality of codes in predetermined order, means associated with said magazine for sensing the codes on said code means, a rotatable contact, a plurality of contacts spaced around said rotatable contact, said spaced contacts being connected to said sensing means for determining the order of sensing said codes, means for causing said pulse producing means to produce a series of electrical pulses, means responsive to said sensing means to limit the number of pulses to that corresponding to the code sensed, means for rotating said rotatable contact after a code has been sensed to make contact with another of said spaced contacts and to cause said pulse producing means to produce another series of electrical pulses and to repeat the sensing cycle until all the codes on said code means have been sensed, said pulse producing means including a plurality of relay means, each relay means triggering the next relay means in succession, each relay means as it is triggered, causing an electrical impulse.

16. An automatic pulse producing system as recited in claim 15 wherein each relay means includes a solenoid and a capacitor, the activation of the solenoid of one relay means charging the capacitor of the next successive relay means, and the inactivation of said solenoid discharging said capacitor through the solenoid of said next successive relay means.

17. In an automatic pulse producing system, a pulse producing means including a pulse circuit, and a selector means, said selector means including a magazine for receiving a code means containing a plurality of codes in predetermined order, switch means having a common contact and a plurality of spaced contacts, said common contact being connected to said pulse circuit, a plurality of first contact means in said magazine, each of said contact means being connected to one of said spaced contacts of said switch means, a plurality of second contact means in said magazine, said second contact means being connected to the pulse producing means, said first and second contact means together sensing the codes on said code means in predetermined order as said common contact sequentially makes connection with each of said spaced contacts, means for causing said pulse producing means to produce a series of electrical pulses, said code means connecting selected members of said first contact means with selected members of said second contact means in accordance with the code on said code means to limit the number of pulses to that corresponding to the code sensed, means to cause said common contact to make connection with the next spaced contact after a code has been sensed and to cause said pulse producing means to produce another series of electrical pulses and to repeat the sensing cycle until all the codes on said code means have been sensed.

18. A pulse producing system as recited in claim 17 wherein said magazine includes means to maintain the code means therein in inoperative position, switch means actuated when said code means are in operative position, said switch means starting the sensing cycle, means to return the code means to the inoperative position when the codes on said code means have been sensed.

19. In a signaling system, a master relay means, a pulse producing circuit, a pulse producing means for producing a pulse in said pulse circuit when said master relay means is activated, said pulse producing means comprising a plurality of relay means, each relay means triggering the next relay means in succession, each relay means, as it is triggered, causing an electrical pulse in said pulse circuit, selector means including a magazine for receiving a code means containing a plurality of codes in predetermined order, means associated with said magazine for sensing the codes on said code means, a rotatable contact, a plurality of contacts spaced around said rotatable contact, said spaced contacts being connected to said sensing means for determining the order of sensing said codes, means responsive to said sensing means to limit the number of pulses to that corresponding to the code sensed, means for rotating said rotatable contact after a code has been sensed to make contact with another of said spaced contacts and to again activate said master relay to cause the pulse producing means to produce another series of pulses and to repeat the sensing cycle until all the codes on said code means have been sensed.

References Cited in the file of this patent

UNITED STATES PATENTS

| | | |
|---|---|---|
| 1,738,624 | Wicks | Dec. 10, 1929 |
| 1,960,129 | Tchoubritch | May 22, 1934 |
| 2,274,100 | Snell | Feb. 24, 1942 |
| 2,287,613 | Hartley | June 23, 1942 |
| 2,505,069 | Savino | Apr. 25, 1950 |
| 2,760,005 | Williamson | Aug. 21, 1956 |